United States Patent
Kang et al.

(10) Patent No.: US 9,323,432 B2
(45) Date of Patent: Apr. 26, 2016

(54) METHOD AND APPARATUS FOR ADJUSTING SIZE OF DISPLAYED OBJECTS

(71) Applicant: Samsung Electronics Co. Ltd., Suwon-si, Gyeonggi-do (KR)

(72) Inventors: Jiyoung Kang, Suwon-si (KR); Sejin Kwak, Seoul (KR); Mijung Park, Hwaseong-si (KR); Saegee Oh, Goyang-si (KR); Chihoon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 13/774,371

(22) Filed: Feb. 22, 2013

(65) Prior Publication Data

US 2013/0227452 A1  Aug. 29, 2013

(30) Foreign Application Priority Data

Feb. 24, 2012 (KR) ........................ 10-2012-0019310

(51) Int. Cl.
 *G06F 3/0484* (2013.01)
 *G06F 3/0488* (2013.01)
(52) U.S. Cl.
 CPC .......... *G06F 3/04842* (2013.01); *G06F 3/0488* (2013.01); *G06F 2203/04806* (2013.01)
(58) Field of Classification Search
 CPC ... G06F 9/4443; G06F 3/0481; G06F 3/0482; G09G 5/14; H04N 5/44591
 USPC ........................................ 715/765
 See application file for complete search history.

(56) References Cited

U.S. PATENT DOCUMENTS

| | | | | |
|---|---|---|---|---|
| 5,655,159 | A  * | 8/1997  | Nakayama et al. | 396/84 |
| 6,380,972 | B1 * | 4/2002  | Suga et al. | 348/211.99 |
| 6,937,272 | B1 * | 8/2005  | Dance | 348/208.2 |
| 7,376,347 | B2   | 5/2008  | Sugimoto | |
| 7,643,012 | B2 * | 1/2010  | Kim | G06F 3/0488 345/173 |
| 8,400,477 | B1 * | 3/2013  | Young et al. | 345/665 |
| 8,406,464 | B2 * | 3/2013  | Karazi | 382/103 |
| 8,478,347 | B2 * | 7/2013  | Kim et al. | 455/566 |
| 8,532,414 | B2 * | 9/2013  | Wang et al. | 382/239 |
| 8,565,835 | B2 * | 10/2013 | Mikami et al. | 455/566 |
| 8,635,547 | B2 * | 1/2014  | Otsuka et al. | 715/768 |
| 2002/0171650 | A1 * | 11/2002 | Prabhakaran | G08G 1/202 345/530 |
| 2004/0105125 | A1 * | 6/2004  | Ezawa | 358/1.16 |
| 2005/0108620 | A1 * | 5/2005  | Allyn | G06F 3/04845 715/255 |
| 2005/0172218 | A1 * | 8/2005  | Nishimura et al. | 715/512 |
| 2005/0219393 | A1 * | 10/2005 | Sugimoto | 348/333.01 |

(Continued)

FOREIGN PATENT DOCUMENTS

| | | |
|---|---|---|
| JP | 4489608 B2 | 4/2010 |
| JP | 2011-211757 A | 10/2011 |

(Continued)

*Primary Examiner* — Jung-Mu Chuang
(74) *Attorney, Agent, or Firm* — Jefferson IP Law, LLP

(57) ABSTRACT

A method and apparatus for adjusting sizes of objects displayed on a screen are provided. The a method includes recognizing one or more objects appearing on the screen, displaying guides indicating regions of the recognized objects on the screen, receiving a selection command for one of the recognized objects, and adjusting, upon reception of a size adjustment command, a size of the region of the selected object with respect to a first axis of the guide associated with the selected object or a second axis thereof perpendicular to the first axis, and displaying the size-adjusted region.

12 Claims, 9 Drawing Sheets

(56) References Cited

U.S. PATENT DOCUMENTS

| | | | |
|---|---|---|---|
| 2007/0216782 A1* | 9/2007 | Chernoff | H04N 5/772 348/231.99 |
| 2008/0016470 A1* | 1/2008 | Misawa et al. | 715/839 |
| 2008/0018670 A1* | 1/2008 | Araki | G06F 3/048 345/660 |
| 2008/0177994 A1* | 7/2008 | Mayer | 713/2 |
| 2008/0267451 A1* | 10/2008 | Karazi | 382/103 |
| 2008/0303801 A1* | 12/2008 | Akaike et al. | 345/173 |
| 2009/0040238 A1* | 2/2009 | Ito | G06F 3/0481 345/660 |
| 2009/0179998 A1* | 7/2009 | Steinberg et al. | 348/222.1 |
| 2010/0060666 A1* | 3/2010 | Fong | 345/661 |
| 2010/0073546 A1* | 3/2010 | Mori | 348/333.12 |
| 2010/0083111 A1* | 4/2010 | de los Reyes | 715/702 |
| 2010/0157129 A1 | 6/2010 | Lee | |
| 2010/0173678 A1* | 7/2010 | Kim | H04N 5/23216 455/566 |
| 2010/0180222 A1* | 7/2010 | Otsuka et al. | 715/768 |
| 2010/0202707 A1* | 8/2010 | Costache et al. | 382/224 |
| 2010/0208138 A1* | 8/2010 | Mohri | G06F 1/1622 348/570 |
| 2011/0093608 A1* | 4/2011 | Sumler et al. | 709/231 |
| 2011/0141492 A1 | 6/2011 | Ebuchi | |
| 2011/0187750 A1* | 8/2011 | Ko et al. | 345/661 |
| 2011/0242396 A1* | 10/2011 | Matsuzawa et al. | 348/333.08 |
| 2011/0267368 A1* | 11/2011 | Casillas et al. | 345/629 |
| 2011/0267530 A1* | 11/2011 | Chun | 348/333.11 |
| 2011/0273474 A1* | 11/2011 | Iwayama | 345/636 |
| 2012/0013645 A1 | 1/2012 | Hu | |
| 2012/0027305 A1* | 2/2012 | Kim et al. | 382/195 |
| 2012/0110491 A1* | 5/2012 | Cheung | 715/771 |
| 2012/0133585 A1* | 5/2012 | Han | G06F 3/017 345/158 |
| 2012/0165078 A1* | 6/2012 | Mikami et al. | 455/566 |
| 2012/0206481 A1* | 8/2012 | Endo | G06F 3/0481 345/619 |
| 2012/0206495 A1* | 8/2012 | Endo | G06F 3/0481 345/661 |
| 2012/0223966 A1* | 9/2012 | Lim | 345/633 |
| 2012/0266068 A1* | 10/2012 | Ryman | G06F 3/0485 715/719 |
| 2013/0106907 A1* | 5/2013 | Davis et al. | 345/629 |
| 2013/0108165 A1* | 5/2013 | Ptucha | 382/195 |
| 2013/0111332 A1* | 5/2013 | Davis | G06F 3/0488 715/247 |
| 2013/0182014 A1* | 7/2013 | Park | 345/649 |
| 2014/0024415 A1* | 1/2014 | Mikami | G06F 3/0485 455/566 |
| 2014/0300569 A1* | 10/2014 | Matsuki et al. | 345/173 |
| 2015/0074602 A1* | 3/2015 | VanBlon | G06F 3/0488 715/815 |

FOREIGN PATENT DOCUMENTS

| | | |
|---|---|---|
| KR | 10-2010-0075167 A | 7/2010 |
| KR | 10-1024705 B1 | 3/2011 |

* cited by examiner

METHOD AND APPARATUS FOR ADJUSTING SIZE OF DISPLAYED OBJECTS

PRIORITY

This application claims the benefit under 35 U.S.C. §119 (a) of a Korean patent application filed on Feb. 24, 2012, in the Korean Intellectual Property Office and assigned Serial No. 10-2012-0019310, the entire disclosure of which is hereby incorporated by reference.

BACKGROUND OF THE INVENTION

1. Field of the Invention

The present invention relates to a method and apparatus for adjusting the sizes of objects displayed on a screen.

2. Description of the Related Art

With advances in display technology, various types of devices are equipped with display screens. In many cases, display screens are used together with traditional non-display functions. For example, in the case of a digital camera, a display screen is used together with a traditional photographing function to enable a user to preview an image before photographing. Most newly developed digital devices such as Portable Multimedia Players (PMP) are equipped with display screens.

If such a display screen is installed in a device, the user may use it to visually check states of the device. That is, the display screen may significantly enhance the convenience and usefulness of a device. Hence, it is expected that display screens will be more frequently used in digital devices.

Digital devices have different screen sizes. Given screen size limitations, the user of a device may have to adjust sizes of objects on the screen in accordance with a currently used function. However, in a regular device, in order to enlarge or reduce the size of a selected object or region, the user may be required to perform a multi-stage or inconvenient input procedure.

SUMMARY OF THE INVENTION

Aspects of the present invention are to address at least the above-mentioned problems and/or disadvantages and to provide at least the advantages described below. Accordingly, an aspect of the present invention is to provide a method and apparatus wherein, for easy object size adjustment on a screen, a guide indicating an object region is displayed and the user may adjust the size of a selected object using the guide.

In accordance with an aspect of the present invention, a method for object size adjustment on a screen is provided. The method includes recognizing one or more objects appearing on the screen, and displaying guides indicating regions of the recognized objects on the screen, receiving a selection command for at least one of the recognized objects, and adjusting, upon reception of a size adjustment command, the size of the region of the selected object with respect to a first axis of the guide associated with the selected object or a second axis thereof perpendicular to the first axis, and displaying the size-adjusted region.

In accordance with another aspect of the present invention, an apparatus for object size adjustment on a screen is provided. The apparatus includes a display unit displaying original images and size-adjusted images, a control unit controlling a process of recognizing one or more objects appearing on the display unit, displaying guides indicating regions of the recognized objects, receiving a selection command for at least one of the recognized objects, adjusting, upon reception of a size adjustment command, the size of the region of the selected object with respect to a first axis of the guide associated with the selected object or a second axis thereof perpendicular to the first axis, and displaying the size-adjusted region.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, an "object" refers to a distinguishable thing or entity on the screen. An object may be independent of another object. For example, a face and a vehicle may be objects. A distinguishable region or area on the screen may also be an object. For example, an icon or a frame on a browser screen may be an object.

A "guide" includes one or more marks indicating an object region. A guide may be displayed, for example, in the form of a corner bracket, a solid line, a dotted line, a rectangle, a square, or a circle, so as to demarcate a region or area.

"Size adjustment" refers to enlargement or reduction of the size of an object.

Figure 1:
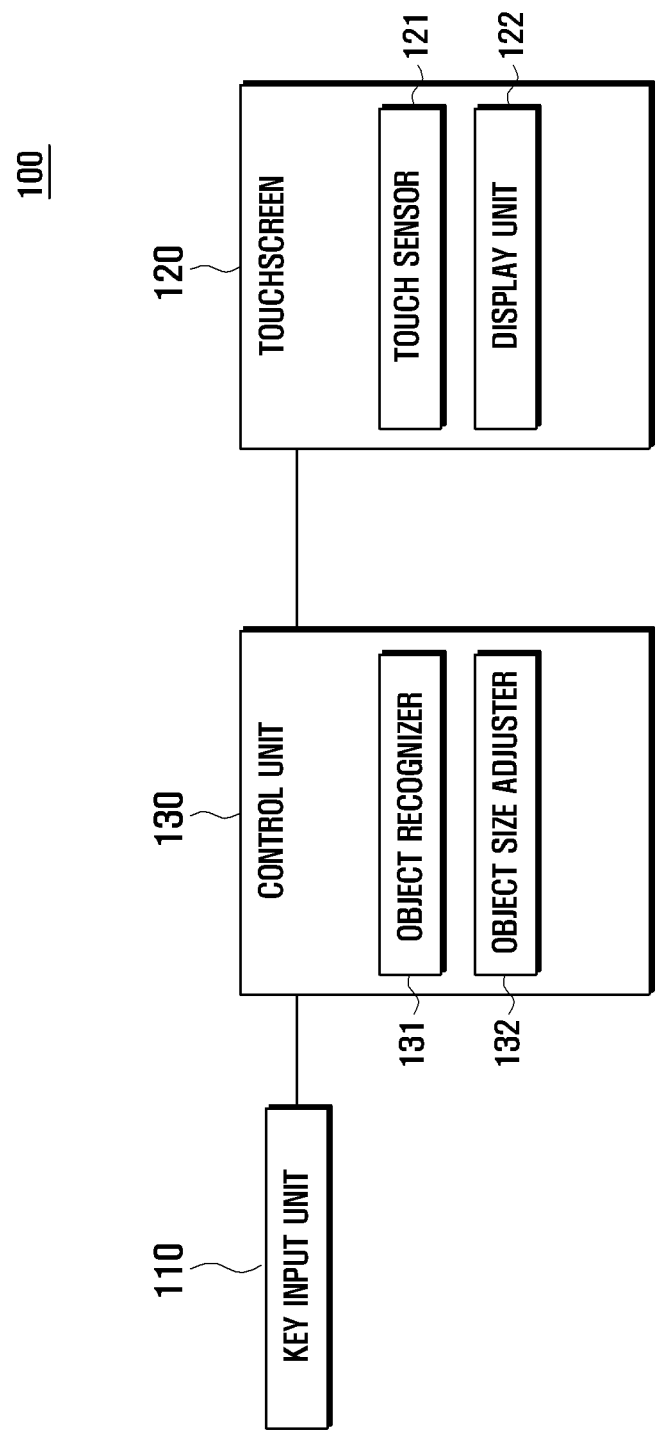
FIG. 1 is a block diagram of an apparatus for object size adjustment according to an exemplary embodiment of the present invention.

FIG. 1 is a block diagram of an apparatus for object size adjustment according to an exemplary embodiment of the present invention.

Referring to FIG. 1, an apparatus 100 for adjusting sizes of objects on a screen may include a key input unit 110, a touchscreen 120, and a control unit 130.

The key input unit 110 generates an input signal for controlling the apparatus 100 in response to key manipulation of a user, and sends the input signal to the control unit 130. The key input unit 110 may include a keypad including hard or soft numeric and direction keys, and function keys attached to the apparatus 100. In an exemplary embodiment, the key input unit 110 may receive user input to select a particular object or region. If the apparatus 100 can be operated by using only the touchscreen 120, then the key input unit 110 may be excluded.

The touchscreen 120 includes a touch sensor 121 and a display unit 122. The touch sensor 121 detects a touch input and location of the user. The touch sensor 121 may be realized, for example, by using a capacitive, resistive, infrared, or pressure sensor. Any sensor capable of detecting contact or pressure may be utilized as the touch sensor 121. The touch sensor 121 generates a touch signal corresponding to the user's touch and sends the touch signal to the control unit 130. The touch signal includes coordinate data of the touch point. If the user makes a touch-point move gesture, the touch sensor 121 generates a touch signal including coordinate data describing the path of the touch-point move, and forwards the generated touch signal to the control unit 130.

In particular, the touch sensor 121 may detect user input (for example, touch, multi-touch, or drag) for selecting an object or region. This is described in more detail later.

The display unit 122 may be realized using Liquid Crystal Display (LCD) devices, Organic Light Emitting Diodes (OLED), or Active Matrix OLED (AMOLED). The display unit 122 provides various information such as menus, input data, and function-setting data to the user in visual form. In particular, the display unit 122 may display original images and size-adjusted images.

Although the apparatus 100 for adjusting object sizes is depicted as having a touchscreen capability, the present exemplary embodiment may be applied to an apparatus for adjusting object sizes with or without a touchscreen capability. If the present exemplary embodiment is applied to an apparatus for adjusting object sizes without a touchscreen capability, the function of the touchscreen 120 may be limited to that of the display unit 122.

The control unit 130 controls overall operations of individual components of the apparatus 100. In particular, the control unit 130 controls a process of recognizing objects on the screen, displaying guides indicating object regions, receiving a command for object selection, receiving a command for size adjustment, adjusting the size of a selected object region with respect to at least a first axis or second axis of the corresponding guide (where the first axis is perpendicular to the second axis), and displaying the size-adjusted object region. To achieve this, the control unit 130 includes an object recognizer 131 and an object size adjuster 132.

The object recognizer 131 may recognize one or more objects appearing on the display unit 122. In the present exemplary embodiment, an object may be any distinguishable thing or entity on the display unit 122, and an object may be independent of another object. For example, a face and a vehicle may be objects. A distinguishable region or area on the screen may also be an object. For example, an icon or a frame on a browser screen may be an object.

In an exemplary embodiment, the object recognizer 131 may recognize an object in various ways. The object recognizer 131 may recognize things or faces appearing in images or moving images being displayed on the screen as objects. If the apparatus 100 is attached to or includes a digital camera, the object recognizer 131 may recognize a subject on which the digital camera is focused as an object. If the apparatus 100 is used for a webpage browser, the object recognizer 131 may recognize frames in the webpage as objects. That is, the object recognizer 131 may recognize a distinguishable region or area on the screen as an object. In addition, if a region on the screen is selected by a command from the key input unit 110 or touch sensor 121, the object recognizer 131 may recognize the selected region as an object.

If an object is recognized by the object recognizer 131, the object size adjuster 132 may control an operation to display a guide indicating a region of the recognized object. In the present exemplary embodiment, a guide includes one or more marks indicating an object region. A guide may be displayed, for example, in the form of a corner bracket, a solid line, a dotted line, a rectangle, a square, or a circle, so as to demarcate a region or area. Here, a region or area may have a first length in a first axis direction and a second length in a second axis direction, where the first axis is perpendicular to the second axis.

The object size adjuster 132 may receive an object selection command from the key input unit 110 or the touch sensor 121. If the touch sensor 121 is used, the object size adjuster 132 may receive various touch events such as touch, multi-touch, and drag, as an object selection command.

If a size adjustment command is received, the object size adjuster 132 may control an operation to adjust the size of a region of the selected object with respect to the first axis or the second axis of the guide, and display the adjusted object region. In the present exemplary embodiment, size adjustment refers to an enlargement or a reduction of the size of an object. In most cases, the first axis and second axis of a guide are parallel with boundary lines of the display unit 122. That is, as the screen of the display unit 122 is typically rectangular, the first axis corresponds to one of the horizontal axis and the vertical axis, and the second axis corresponds to the other axis.

Assuming that the longer axis is the reference axis, the object size adjuster 132 may enlarge the size of a region in accordance with the length of the display unit 122 in the direction of the reference axis. The object size adjuster 132 may also enlarge the size of a region while maintaining the width-to-height ratio of the corresponding guide.

If a selection command selecting two or more objects is received, the object size adjuster 132 may treat the two or more selected objects as a single combined object and display a guide indicating the region of the combined object.

If an adjustment cancel command is received from the key input unit 110 or touch sensor 121, the object size adjuster 132 may restore an original size of a size-adjusted region and display the region at the original size.

In the above description, although the control unit 130, the object recognizer 131 and the object size adjuster 132 are treated as separate entities having different functions, they need not necessarily be separate entities. For example, the control unit 130 may directly perform the functions of the object recognizer 131 and object size adjuster 132.

In the following description, for ease of description, it is assumed that functions of the object recognizer 131 and object size adjuster 132 are directly performed by the control unit 130.

Figure 2:
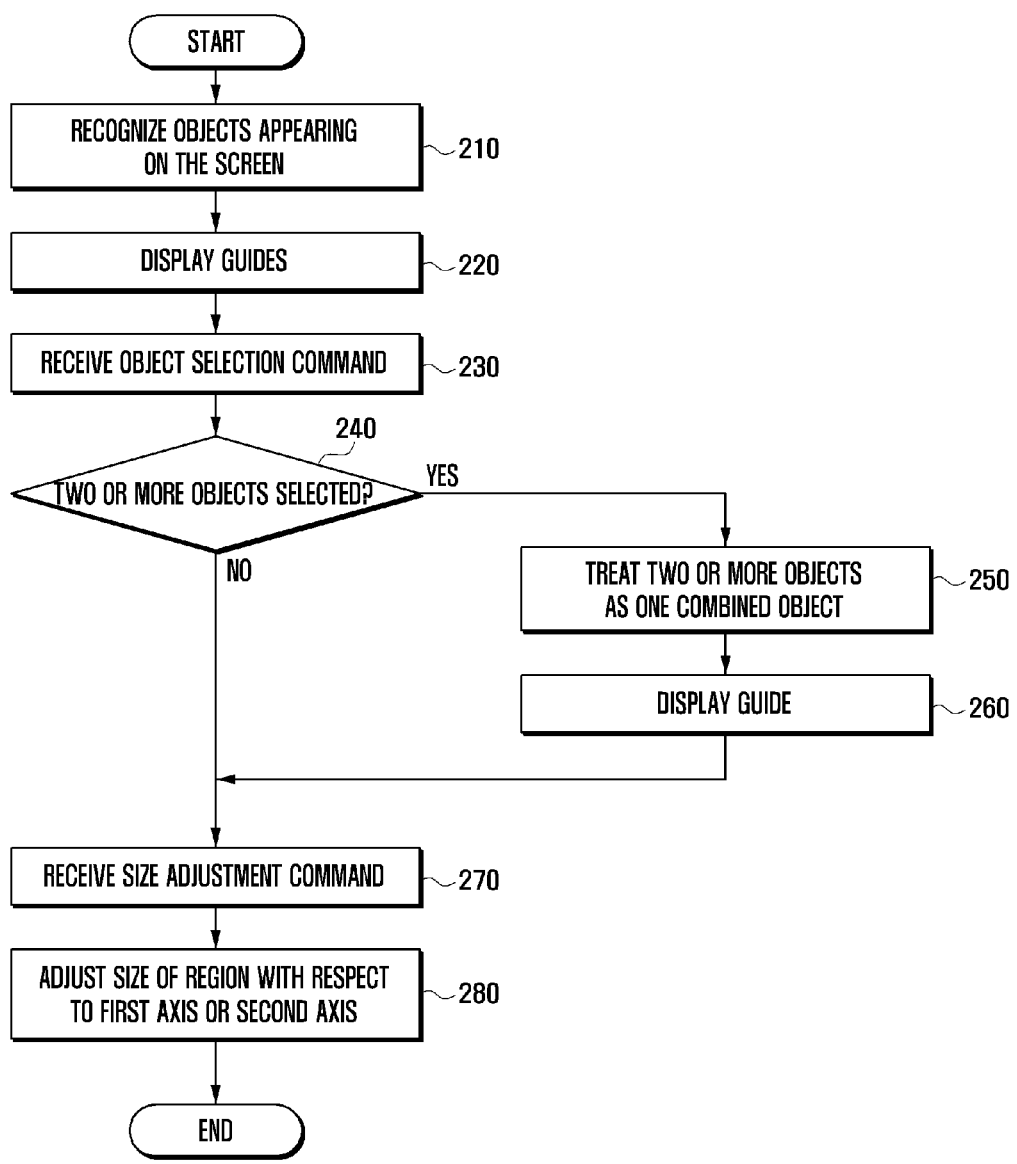
FIG. 2 is a flowchart of a method for object size adjustment according to an exemplary embodiment of the present invention.

FIG. 2 is a flowchart of a method for object size adjustment according to an exemplary embodiment of the present invention.

Referring to FIG. 2, the control unit 130 of the object size adjustment apparatus 100 recognizes objects appearing on the screen in step 210. Still or moving images may be displayed on the screen. Here, an object may be any distinguishable thing or entity on the screen, and may be independent of another object. For example, a face and a vehicle may be objects. A distinguishable region or area on the screen may also be an object. For example, an icon or a frame on a browser screen may be an object.

The control unit 130 may recognize an object in various ways. For example, the control unit 130 may recognize things or faces appearing in still images or in moving images displayed on the screen as objects. If the apparatus 100 is attached to or includes a digital camera, the control unit 130 may recognize a subject on which the digital camera is focused as an object. If the apparatus 100 is used for a webpage browser, the control unit 130 may recognize frames in the displayed webpage as objects. That is, the object recognizer 131 may recognize a distinguishable region or area on the screen as an object.

The control unit 130 displays guides for the recognized objects in step 220. Here, a guide is one or more marks indicating an object region. A guide may be displayed, for example, in the form of a corner bracket, a solid line, a dotted line, a rectangle, a square, or a circle so as to demarcate a specific region or area.

The control unit 130 receives an object selection command in step 230. The control unit 130 determines whether two or more objects are selected in step 240. If no more than a single object is selected, the control unit 130 proceeds to step 270, and if two or more objects are selected, the control unit 130 proceeds to step 250.

The control unit 130 may receive an object selection command from the key input unit 110 or the touch sensor 121. If the touch sensor 121 is used, the control unit 130 may receive various touch events such as touch, multi-touch, and drag, as an object selection command. This is described in more detail later.

If two or more objects are selected, the control unit 130 treats the selected objects as one combined object in step 250, and displays a guide indicating the region of the combined object in step 260.

The control unit 130 receives a size adjustment command from the key input unit 110 or the touch sensor 121 in step 270, and adjusts the size of the region of the selected object with respect to the first axis or second axis in step 280. In most cases, the first axis and second axis are parallel with boundary lines of the display unit 122. That is, as the screen of the display unit 122 is typically rectangular, the first axis corresponds to one of the horizontal axis and the vertical axis, and the second axis corresponds to the other axis.

The control unit 130 may enlarge, assuming that the longer axis is the reference axis, the object region in accordance with the length of the display unit 122 in the direction of the reference axis. The control unit 130 may also enlarge the object region while maintaining the width-to-height ratio of the corresponding guide.

Thereafter, if an adjustment cancel command is received from the key input unit 110 or the touch sensor 121, the control unit 130 may restore the original size of the adjusted object region and display the region at the original size (not shown).

Figure 3:
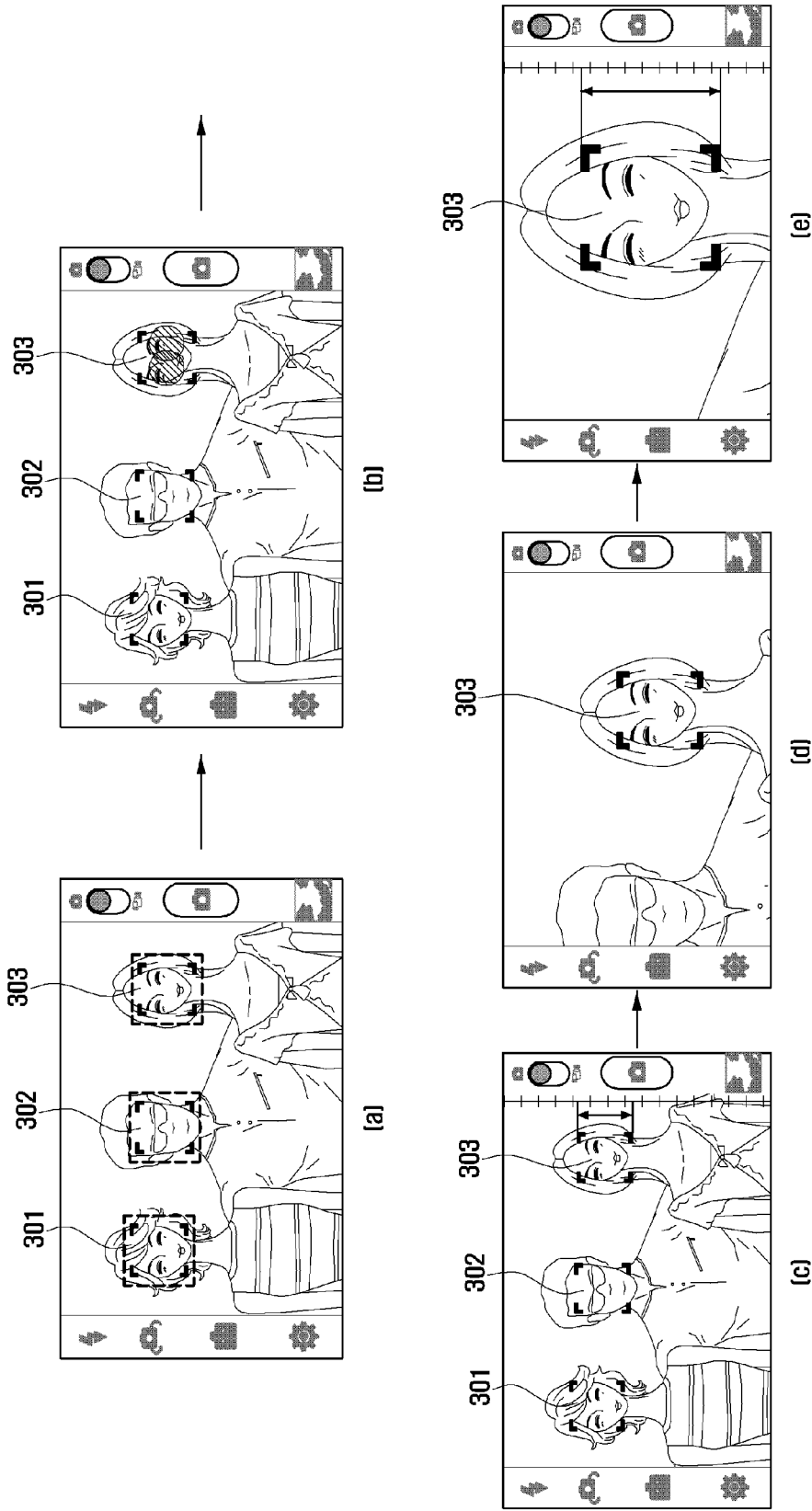
FIG. 3 is screen representations illustrating enlargement of an object region with respect to the vertical axis of a guide according to an exemplary embodiment of the present invention.

FIG. 3 is screen representations illustrating enlargement of an object region with respect to the vertical axis of a guide according to an exemplary embodiment of the present invention.

Referring to screen representation (a) of FIG. 3, the control unit 130 recognizes faces appearing in the displayed image as objects 301, 302 and 303, and displays guides made of, for example, dotted lines and corner bracket marks. Guides may be displayed in various forms, and may be made of one of dotted lines and corner bracket marks.

Referring to screen representation (b) of FIG. 3, the control unit 130 receives a selection command and a size adjustment command for the rightmost object 303. Size adjustment is an enlargement or a reduction of an object. In this example, two touch inputs occur on the object 303, the first touch input is a selection command for the object 303, and the second touch input is a size adjustment command. The selection command and size adjustment command may also be generated via the key input unit 110 or by other types of touch gestures.

Referring to screen representations (c), (d), and (e) of FIG. 3, assume that the first axis of the guide associated with the object 303 is the vertical direction and the second axis is the horizontal direction. Then, as the first axis is longer, it becomes the reference axis. The first axis of the guide may be the same as a longer axis of the display, but this is not required. Hence, the object 303 is enlarged with respect to the first axis (in the vertical direction) in accordance with the screen size and is enlarged along the second axis (in the horizontal direction) according to the guide ratio.

Referring to screen representation (e) of FIG. 3, if an adjustment cancel command, such as a touch on the outside of the guide, is received, the control unit 130 may restore the original size of the adjusted region and display the readjusted region at the original size (not shown).

Figure 4:
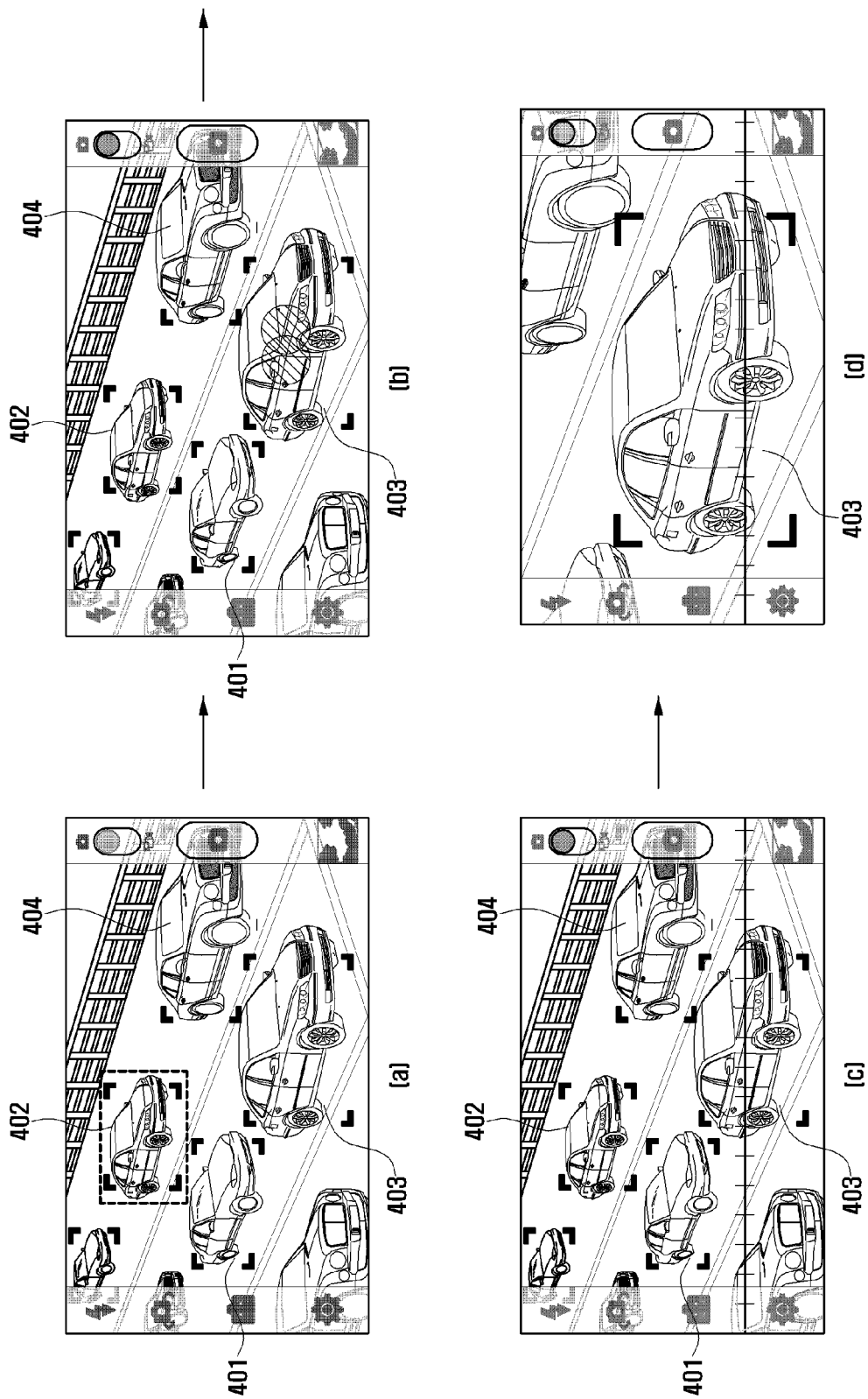
FIG. 4 is screen representations illustrating enlargement of an object region with respect to the horizontal axis of a guide according to an exemplary embodiment of the present invention.

FIG. 4 is screen representations illustrating enlargement of an object region with respect to the horizontal axis of a guide according to an exemplary embodiment of the present invention.

Referring to screen representation (a) of FIG. 4, the control unit 130 recognizes cars appearing in the displayed image as objects 401, 402, 403, and 404, and displays guides made of, for example, dotted lines and corner bracket marks. Guides may be displayed in various forms, and may be made of one of dotted lines and corner bracket marks. In screen representation (b) of FIG. 4, the control unit 130 receives a selection command and a size adjustment command for the bottom-middle object 403. Two touch inputs occur on the object 403, the first touch input is a selection command for the object 403, and the second touch input is a size adjustment command therefor.

Referring to screen representations (c) and (d) of FIG. 4, assume that the first axis of the guide associated with the object 403 is the vertical direction and the second axis is the horizontal direction. Then, as the second axis is longer, it becomes the reference axis. Hence, the object 403 is enlarged with respect to the second axis (in the horizontal direction) in accordance with the screen size and is enlarged along the first axis (in the vertical direction) according to the guide ratio. In screen representation (d) of FIG. 4, if an adjustment cancel command such as a touch on the outside of the guide is received, the control unit 130 may restore the original size of the adjusted region and display the readjusted region at the original size (not shown).

Figure 5:
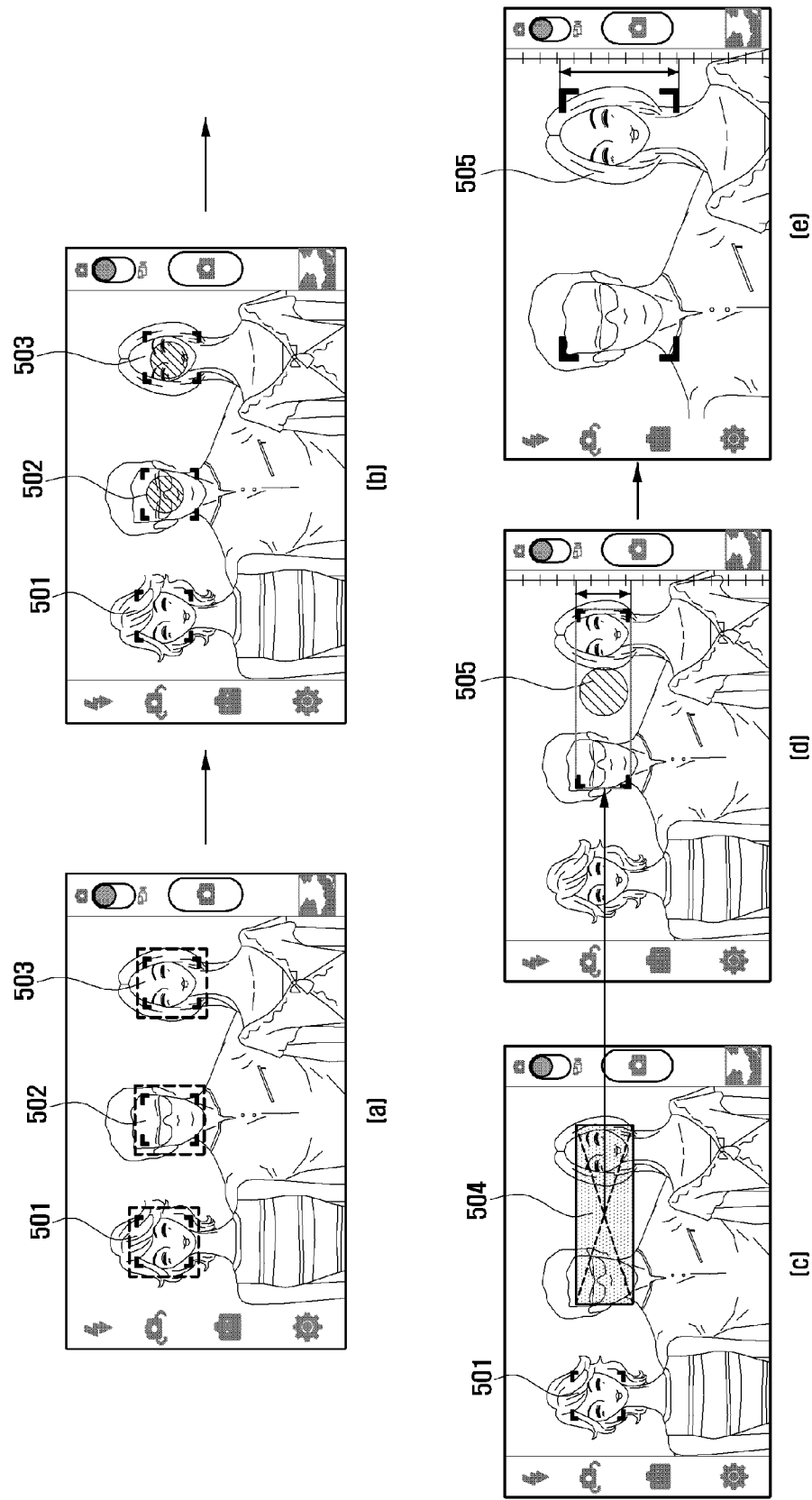
FIG. 5 shows an illustration for enlargement of an object region if two or more objects are selected according to an exemplary embodiment of the present invention.

FIG. 5 shows an illustration for enlargement of an object region if two or more objects are selected according to an exemplary embodiment of the present invention.

Referring to screen representation (a) of FIG. 5, the control unit 130 recognizes faces appearing in the displayed image as objects 501, 502, and 503, and displays guides made of dotted lines and corner bracket marks.

Referring to screen representation (b) of FIG. 5, the control unit 130 receives a selection command for the middle object 502 and the right object 503. Two touch inputs occur to select the two objects, one touch input is a selection command for the object 502, and another touch input is a selection command for the object 503. Multiple objects may be selected together in various ways. For example, two or more objects may be selected at once through the key input unit 110 or through a multi-touch gesture. Use of other exemplary touch inputs is described further in connection with FIG. 6.

In response to selection of multiple objects in screen representation (b) of FIG. 5, the control unit 130 treats the selected multiple objects as a single combined object as shown in screen representation (c) of FIG. 5. A translucent box 504 in screen representation (c) of FIG. 5 is merely a visual indicator for the description of the combining process, and thus may be displayed but is not required in practice.

Referring to screen representation (d) of FIG. 5, the control unit 130 controls the display unit 122 to display a guide indicating the region of the combined object 505. If a touch input occurs on the combined object 505, the control unit 130 enlarges the combined object 505 as in screen representation (e) of FIG. 5. Assume that the first axis of the guide associated with the combined object 505 is the vertical direction and the second axis is the horizontal direction. Then, as the second axis is longer, it becomes the reference axis. Hence, the combined object 505 is enlarged with respect to the second axis (the horizontal direction) in accordance with the screen size and is enlarged along the first axis (the vertical direction) according to the guide ratio. In screen representation (d) of FIG. 5, if an adjustment cancel command such as a touch on the outside of the guide is received, the control unit 130 may restore the original size of the adjusted region and display the readjusted region at the original size (not shown).

Figure 6:
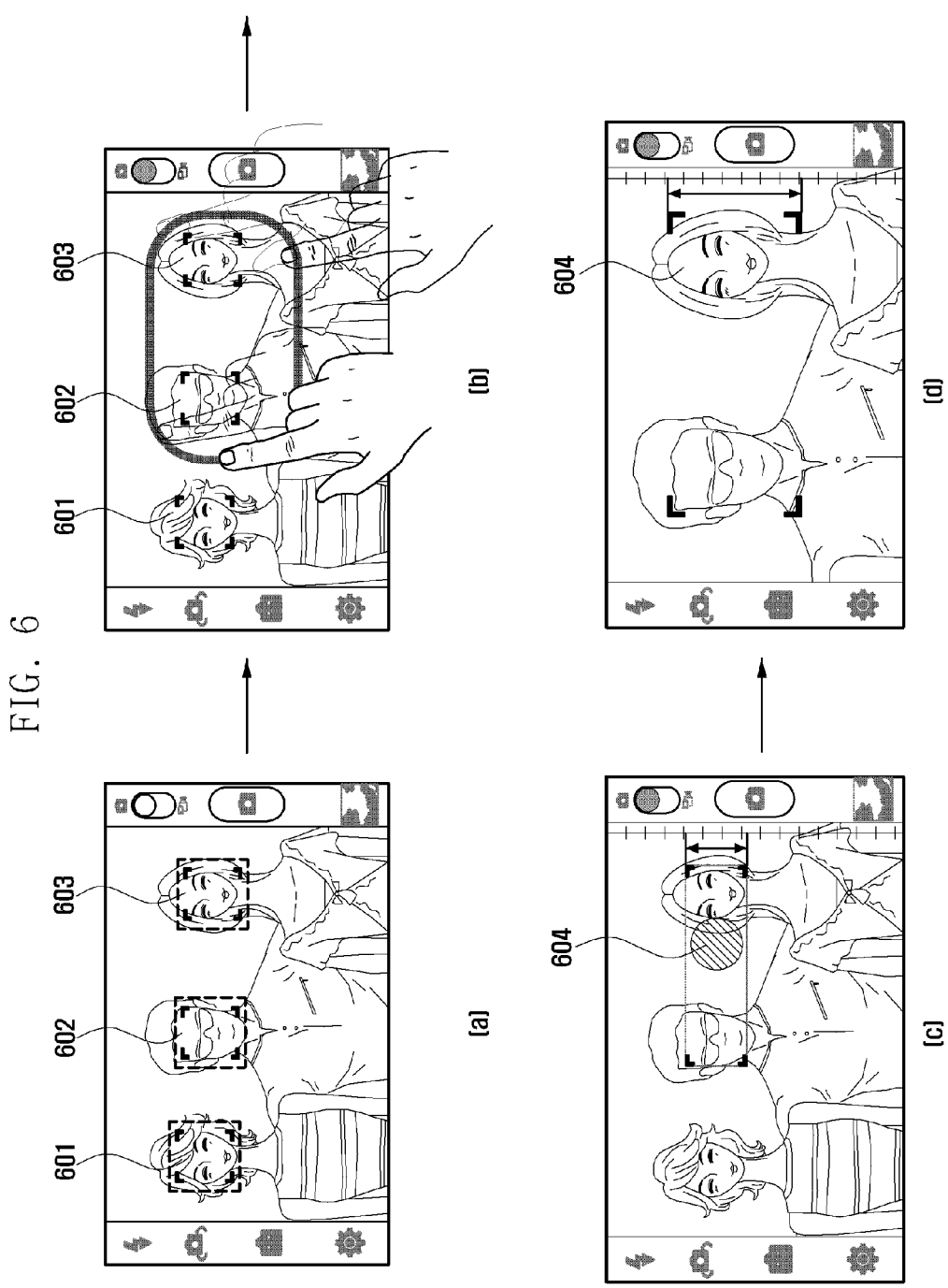
FIG. 6 shows another illustration for enlargement of an object region if two or more objects are selected according to an exemplary embodiment of the present invention.

FIG. 6 shows an illustration for enlargement of an object region if two or more objects are selected according to an exemplary embodiment of the present invention.

Referring to FIG. 6, two or more objects are selected in a way different from that in FIG. 5. In screen representation (a) of FIG. 6, the control unit 130 recognizes faces appearing in the displayed image as objects 601, 602, and 603, and displays guides made of dotted lines and corner bracket marks.

Referring to screen representation (b) of FIG. 6, the middle object 602 and the right object 603 are simultaneously selected by the user drawing a circle surrounding the middle object 602 and the right object 603, in a manner different from that of FIG. 5 where two objects were selected by consecutive touches.

In response to the selection of multiple objects, in the same manner as in FIG. 5, the control unit 130 treats the selected multiple objects as a single combined object 604 and controls the display unit 122 to display a guide indicating the region of the combined object 604 as shown in screen representation (c) of FIG. 6. The combined object 604 is according to the objects that were included in the circle, rather than the circle itself. If a touch input occurs on the combined object 604, the control unit 130 enlarges the combined object 604 as in screen representation (d) of FIG. 6.

Unlike the case of FIG. 5, if a circle is drawn so as to enclose multiple objects as in FIG. 6, as it is determined that selection is completed, it is possible to directly perform size adjustment without a separate size adjustment command. Although FIGS. 3 to 6 illustrate object enlargement only, it is also possible to perform object reduction in a similar way. The size of objects may thus be adjusted to be larger or smaller.

Figure 7:
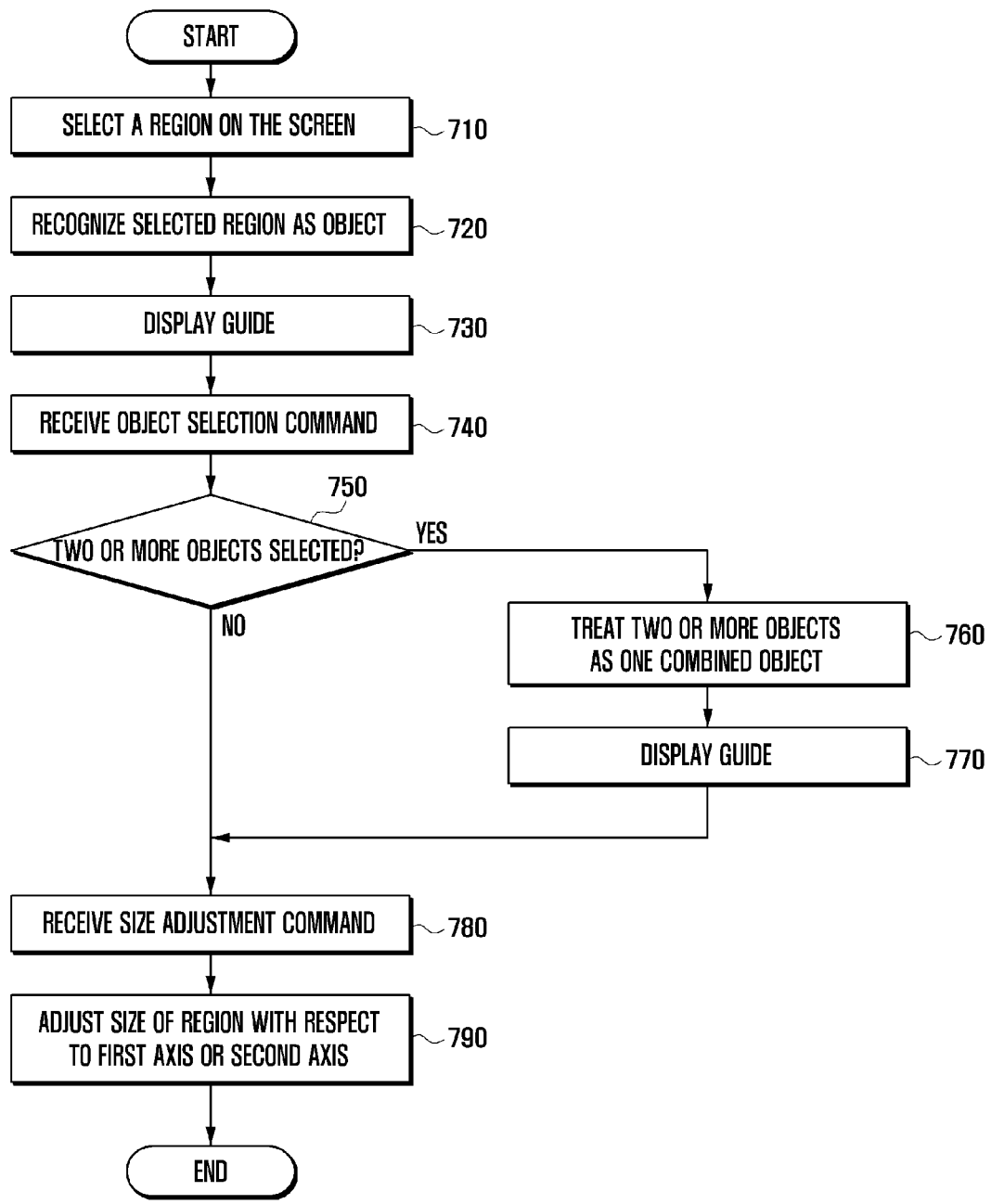
FIG. 7 is a flowchart of a procedure for object region enlargement regarding a selected region as a single object according to an exemplary embodiment of the present invention.

FIG. 7 is a flowchart of a procedure for object region enlargement regarding a selected region as a single object according to an exemplary embodiment of the present invention.

Referring to FIG. 7, the control unit 130 receives a selection command for a region on the screen through the key input unit 110 or the touch sensor 121 in step 710. The control unit 130 recognizes the selected region as an object in step 720. Here, the selected region may be a distinguishable region having lengths in first and second axis directions. The size of a region may be adjusted with respect to a first axis or a second axis perpendicular to the first axis. Here, an object may be any distinguishable thing or entity on the screen, and may be independent of another object. For example, a face and a vehicle may be objects. A distinguishable region or area on the screen may also be an object. For example, an icon or a frame on a browser screen may be an object.

The control unit 130 may recognize an object in various ways. For example, the control unit 130 may recognize things or faces appearing in still images or in moving images displayed on the screen as objects. If the apparatus 100 is attached to or includes a digital camera, the control unit 130 may recognize a subject on which the digital camera is focused as an object. If the apparatus 100 is used for a webpage browser, the control unit 130 may recognize frames in the displayed webpage as objects. That is, the object recognizer 131 may recognize a distinguishable region or area on the screen as an object.

Thereafter, the control unit 130 displays a guide for the recognized object in step 730. Here, a guide is one or more marks indicating an object region. A guide may be displayed, for example, in the form of a corner bracket, a solid line, a dotted line, a rectangle, a square, or a circle, so as to demarcate a specific region or area.

The control unit 130 receives an object selection command in step 740. The control unit 130 determines whether two or more objects are selected in step 750. If no more than a single object is selected, the control unit 130 proceeds to step 780; and if two or more objects are selected, the control unit 130 proceeds to step 760.

The control unit 130 may receive an object selection command through the key input unit 110 or touch sensor 121. If the touch sensor 121 is used, the control unit 130 may receive various touch events, such as touch, multi-touch, and drag, as an object selection command.

If two or more objects are selected, the control unit 130 treats the selected objects as one combined object in step 760, and displays a guide indicating the region of the combined object in step 770.

The control unit 130 receives a size adjustment command from the key input unit 110 or touch sensor 121 in step 780, and adjusts the size of the region of the selected object with respect to the first axis or second axis in step 790.

Thereafter, if an adjustment cancel command is received from the key input unit 110 or the touch sensor 121, the control unit 130 may restore the original size of the adjusted object region and display the region at the original size (not shown).

An exemplary embodiment is described with reference to FIGS. 8 and 9, in which web browser screens are used.

Figure 8:
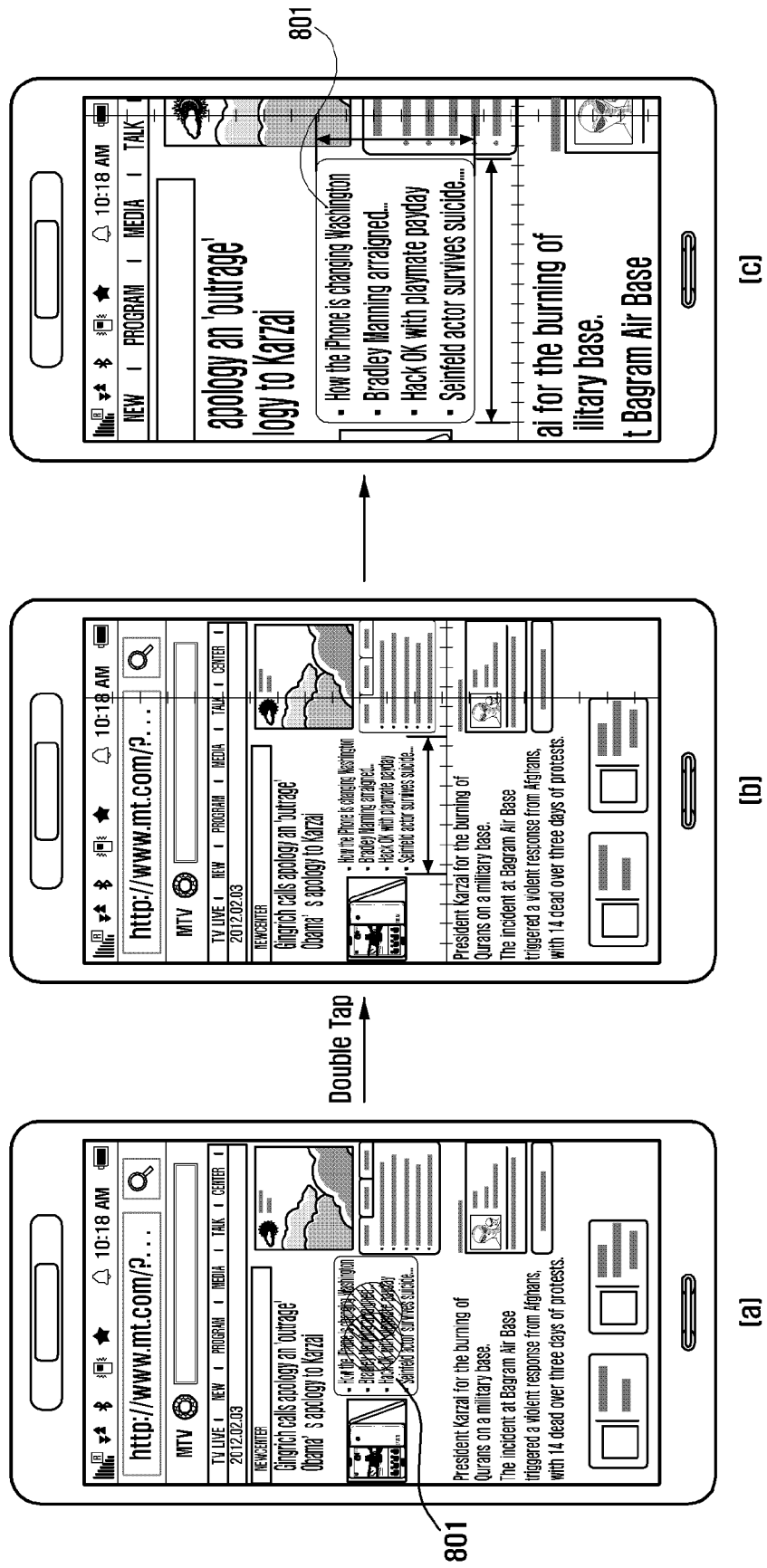
FIG. 8 shows an illustration for enlargement of an object region according to an exemplary embodiment of the present invention.

FIG. 8 shows an illustration for enlargement of an object region according to an exemplary embodiment of the present invention. In FIG. 8, the control unit 130 recognizes a specific region as an object without explicit reception of a selection command.

Referring to screen representation (a) of FIG. 8, the control unit 130 recognizes a frame in the displayed webpage as an object 801 and displays a guide made of a solid line. A guide may be displayed in various forms. The control unit 130 receives a selection command and a size adjustment command for the object 801. Size adjustment may be enlargement or reduction of an object. In this example, a single touch input of a size adjustment command for object 801 is also recognized as the selection command. The selection command and the size adjustment command may also be generated by the key input unit 110 or by other types of touch gestures.

Referring to screen representations (b) and (c) of FIG. 8, assume that the first axis of the selected object 801 is in the vertical direction and the second axis is in the horizontal direction. Then, as the second axis is longer, it becomes the reference axis. Hence, the object 801 is enlarged with respect to the second axis (in the horizontal direction) in accordance with the screen size and is enlarged along the first axis (in the vertical direction) according to the guide ratio.

Figure 9:
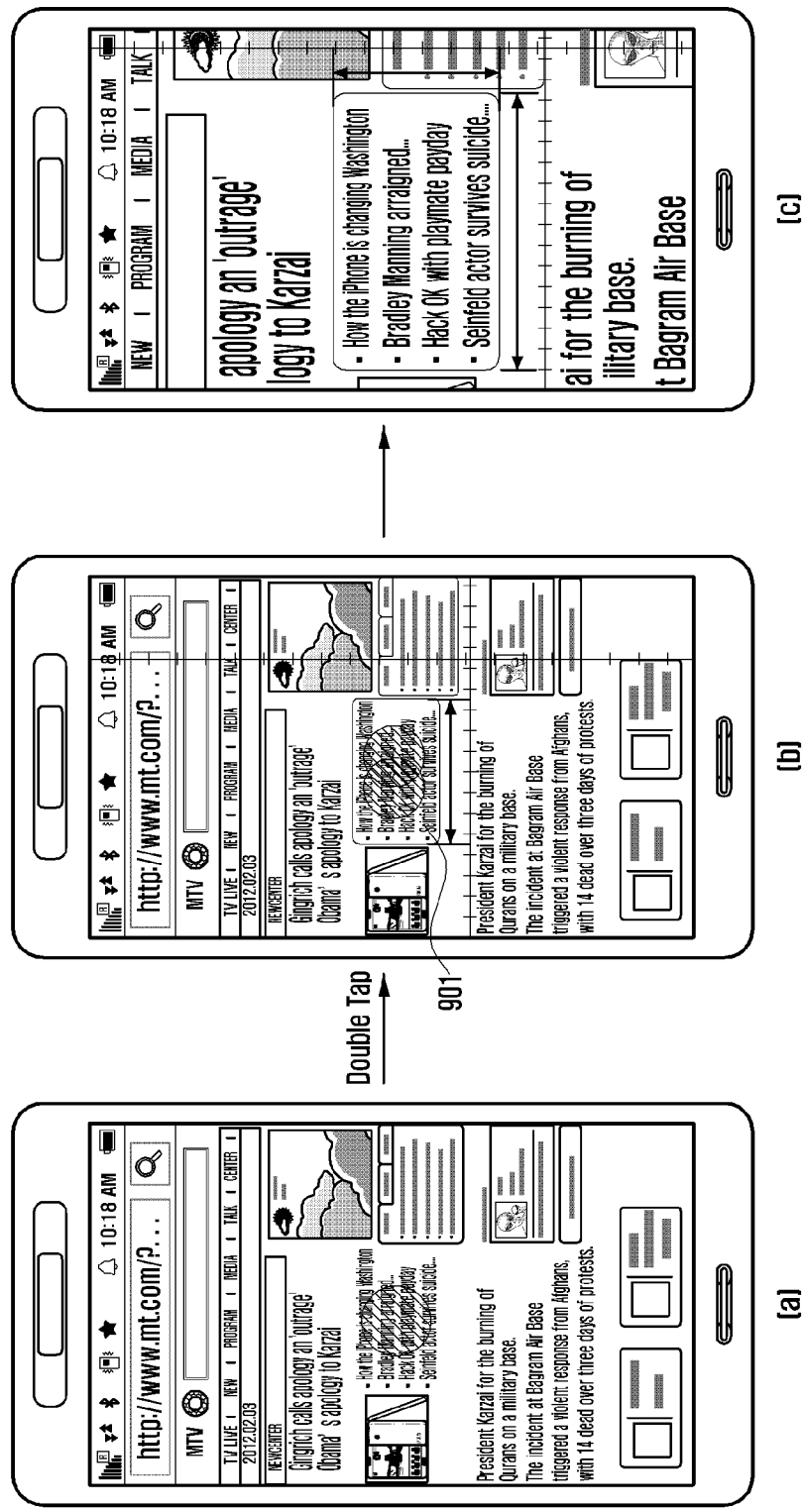
FIG. 9 shows an illustration for object region enlargement regarding a selected region as a single object according to an exemplary embodiment of the present invention.

FIG. 9 shows an illustration for object region enlargement regarding a selected region as a single object according to an exemplary embodiment of the present invention.

Referring to screen representation (a) of FIG. 9, the control unit 130 receives a touch input as a selection command for a region in the displayed webpage. Then, the control unit 130 recognizes the selected region as an object.

Referring to screen representation (b) of FIG. 9, the control unit 130 displays a guide made of a solid line for the recognized object 901. A guide may be displayed in various forms. The control unit 130 receives a selection command and a size adjustment command for the object 901. Size adjustment is enlargement or reduction of an object. Two touch inputs occur on the object 901. For example, the first touch input is a selection command for the object 901, and the second touch input is a size adjustment command. The selection command and size adjustment command may also be generated by the key input unit 110 or by other types of touch gestures.

As described above, a specific region may be recognized as an object without an explicit selection command, and the size of the recognized object may be directly adjusted in response to a size adjustment command.

In exemplary embodiments of the present invention, the user may adjust the size of a selected object in a more convenient manner without performing a multi-stage or cumbersome input procedure.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for object size adjustment on a screen, the method comprising:
   recognizing one or more objects appearing on the screen, and displaying guides indicating regions of the recognized objects on the screen;
   receiving a selection command for selecting at least one object of the recognized objects;
   grouping, if two or more objects are selected by the selection command, the two or more selected objects into a single combined object;
   displaying a guide indicating a region of the single combined object;
   adjusting, using the guide associated with the selected at least one object, according to a received size adjustment command, a size of the region of the selected at least one object with respect to a first axis of the guide associated with the selected at least one object or a second axis thereof perpendicular to the first axis;
   displaying the size-adjusted region;
   receiving an adjustment cancel command comprising an input on the outside of the guide after the displaying of the size-adjusted region; and
   restoring an original size of the size-adjusted region and displaying the region at the original size in response to the adjustment cancel command,
   wherein the selected at least one object comprises the single combined object,
   wherein the region is adjusted with respect to one of the first axis and second axis according to a size of the screen and is adjusted with respect to the other of the first axis and second axis according to a size ratio of the first axis and the second axis of the guide, and
   wherein the adjusting of the size of the region comprises enlarging, after treating a longer one of the first axis and the second axis as a reference axis, the region in accordance with the screen size in the direction of the reference axis, and displaying the enlarged region.

2. The method of claim 1, wherein the adjusting of the size of the region comprises:
   enlarging the region while maintaining a width-to-height ratio of the corresponding guide, and
   displaying the enlarged region.

3. The method of claim 1, wherein each object comprises a distinguishable thing, entity, or region of the screen.

4. The method of claim 1, wherein each guide comprises at least one of a corner bracket, a solid line, a dotted line, a rectangle, a square, and a circle.

5. The method of claim 1, wherein the guide associated with the at least one selected object demarcates the second region or an area of the at least one selected object.

6. The method of claim 1, wherein the first axis and second axis are each parallel with boundaries of the screen.

7. A method for object size adjustment on a screen, the method comprising:
   recognizing one or more objects appearing on a screen;

receiving a first selection command for a first region on the screen;

recognizing the selected first region as an object, and displaying a guide indicating the recognized first region on the screen;

receiving a second selection command for a second region of the recognized first region;

grouping, if two or more objects are selected by the second selection command, the two or more selected objects into a single combined object;

displaying a guide indicating the second region of the single combined object;

adjusting, using the guide associated with the second region, according to a received size adjustment command, a size of the recognized second region with respect to a first axis of the guide associated with the recognized second region or a second axis thereof perpendicular to the first axis;

displaying the size-adjusted second region;

receiving an adjustment cancel command comprising an input on the outside of the guide associated with the second region after the displaying of the size-adjusted second region; and restoring an original size of the size-adjusted second region and displaying the restored size-adjusted second region at the original size in response to the adjustment cancel command, wherein the second region comprises the single combined object, wherein the second region is adjusted with respect to one of the first axis and second axis according to a size of the screen and is adjusted with respect to the other of the first axis and second axis according to a size ratio of the first axis and the second axis of the second region, and wherein the adjusting of the size of the second region comprises enlarging, after treating a longer one of the first axis and the second axis as a reference axis, the second region in accordance with the screen size in the direction of the reference axis, and displaying the enlarged region.

8. The method of claim 7, wherein the selected second region is a distinguishable region having a length in the first axis direction and a length in the second axis direction.

9. An apparatus for object size adjustment on a screen, the apparatus comprising:

a display unit configured to display original images and size-adjusted images;

a control unit configured to:

control a process of recognizing one or more objects appearing on the display unit, control the display unit to display guides indicating regions of the recognized objects, receive a selection command for selecting at least one object of the recognized objects, group, if two or more objects are selected by the selection command, the two or more selected objects into a single combined object, control the display unit to display a guide indicating a region of the single combined object, adjust, using the guide associated with the selected at least one object, according to a received size adjustment command, a size of the region of the selected at least one object with respect to a first axis of the guide associated with the selected at least one object or a second axis thereof perpendicular to the first axis, control the display unit to display the size-adjusted region, restore, if an adjustment cancel command comprising an input on the outside of the guide is received after the displaying of the size-adjusted region, an original size of the size-adjusted region, and display the region at the original size, wherein the selected at least one object comprises the single combined object, wherein the region is adjusted with respect to one of the first axis and second axis according to a size of the screen and is adjusted with respect to the other of the first axis and second axis according to a size ratio of the first axis and the second axis of the guide, and wherein the control unit is further configured to adjust the size of the region by enlarging, after treating a longer one of the first axis and second axis as a reference axis, the region in accordance with the screen size of the display unit in the direction of the reference axis and displaying the enlarged region.

10. The apparatus of claim 9, wherein the control unit is further configured to adjust the size of the selected region by enlarging the region while maintaining a width-to-height ratio of the corresponding guide and displaying the enlarged region.

11. An apparatus for object size adjustment on a screen, the apparatus comprising:

a display unit configured to display original images and size-adjusted images;

a control unit configured to:

control a process of recognizing one or more objects appearing on the display unit, recognize, upon reception of a first selection command for a first region of the display unit, the selected first region as a first object and displaying a guide indicating the first object on the display unit, receive a second selection command for a second region of the recognized first region, group, if two or more objects are selected by the second selection command, the two or more selected objects into a single combined object, control the display unit to display a guide indicating the second region of the single combined object, adjust, using a guide associated with the second region, according to a received size adjustment command, a size of the recognized second region with respect to a first axis of the guide associated with the recognized second region or a second axis thereof perpendicular to the first axis, control the display unit to display the size-adjusted second region, restore, if an adjustment cancel command comprising an input on the outside of the guide is received after the displaying of the size-adjusted second region, an original size of the size-adjusted second region, and display the second region at the original size, wherein the second region comprises the single combined object, wherein the second region is adjusted with respect to one of the first axis and second axis according to a size of the screen and is adjusted with respect to the other of the first axis and second axis according to a size ratio of the first axis and the second axis of the second region, and wherein the control unit is further configured to adjust the size of the selected second region by enlarging, after treating a longer one of the first axis and second axis as a reference axis, the second region in accordance with the screen size of the display unit in the direction of the reference axis and displaying the enlarged second region.

12. The apparatus of claim 11, wherein the selected second region comprises a distinguishable region having a length in the first axis direction and a length in the second axis direction.

* * * * *